April 6, 1954  K. C. CLARK  2,674,393
SPARE WHEEL CARRIER
Filed Dec. 4, 1951  3 Sheets-Sheet 1
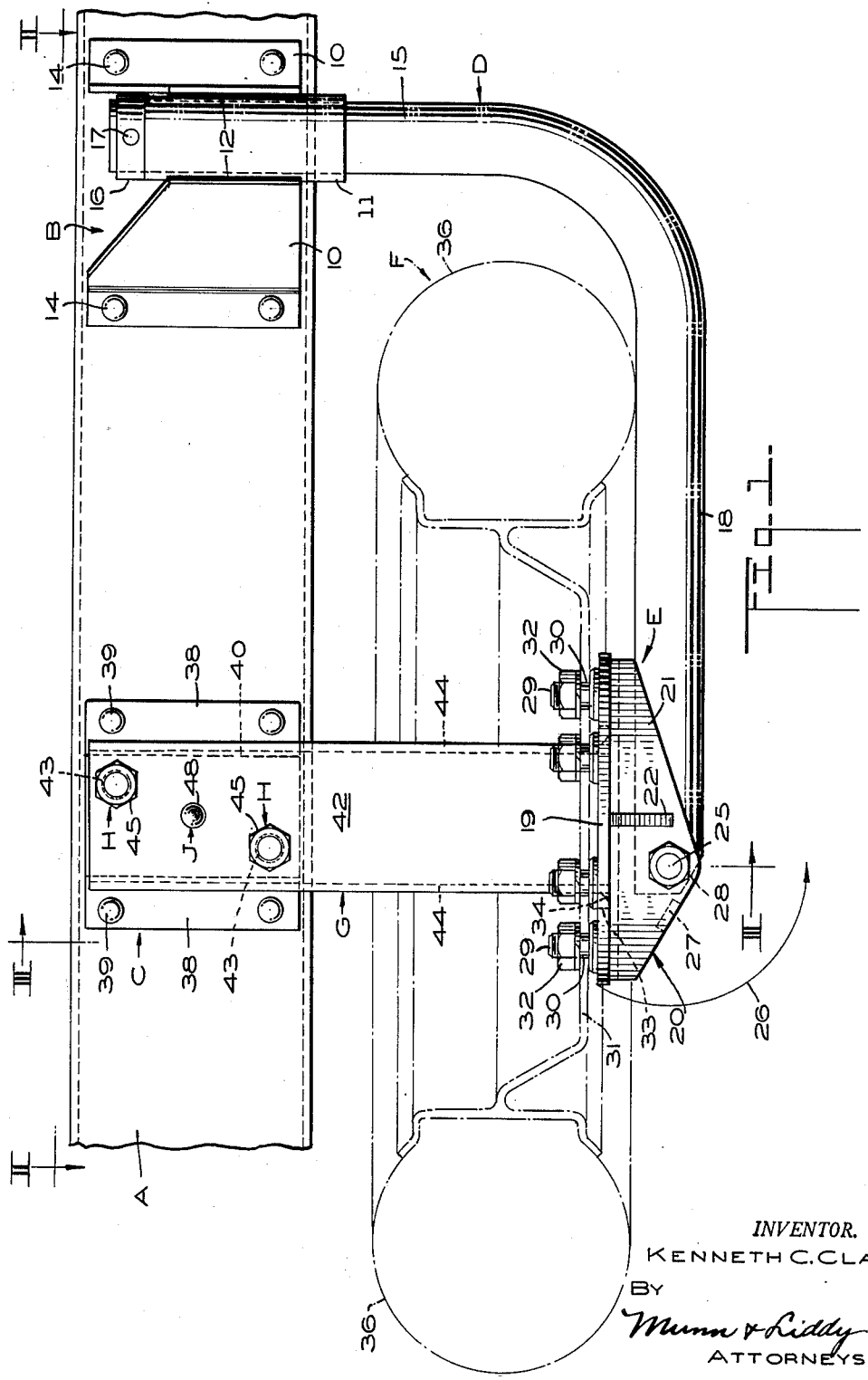
INVENTOR.
KENNETH C. CLARK
BY
Munn & Liddy
ATTORNEYS

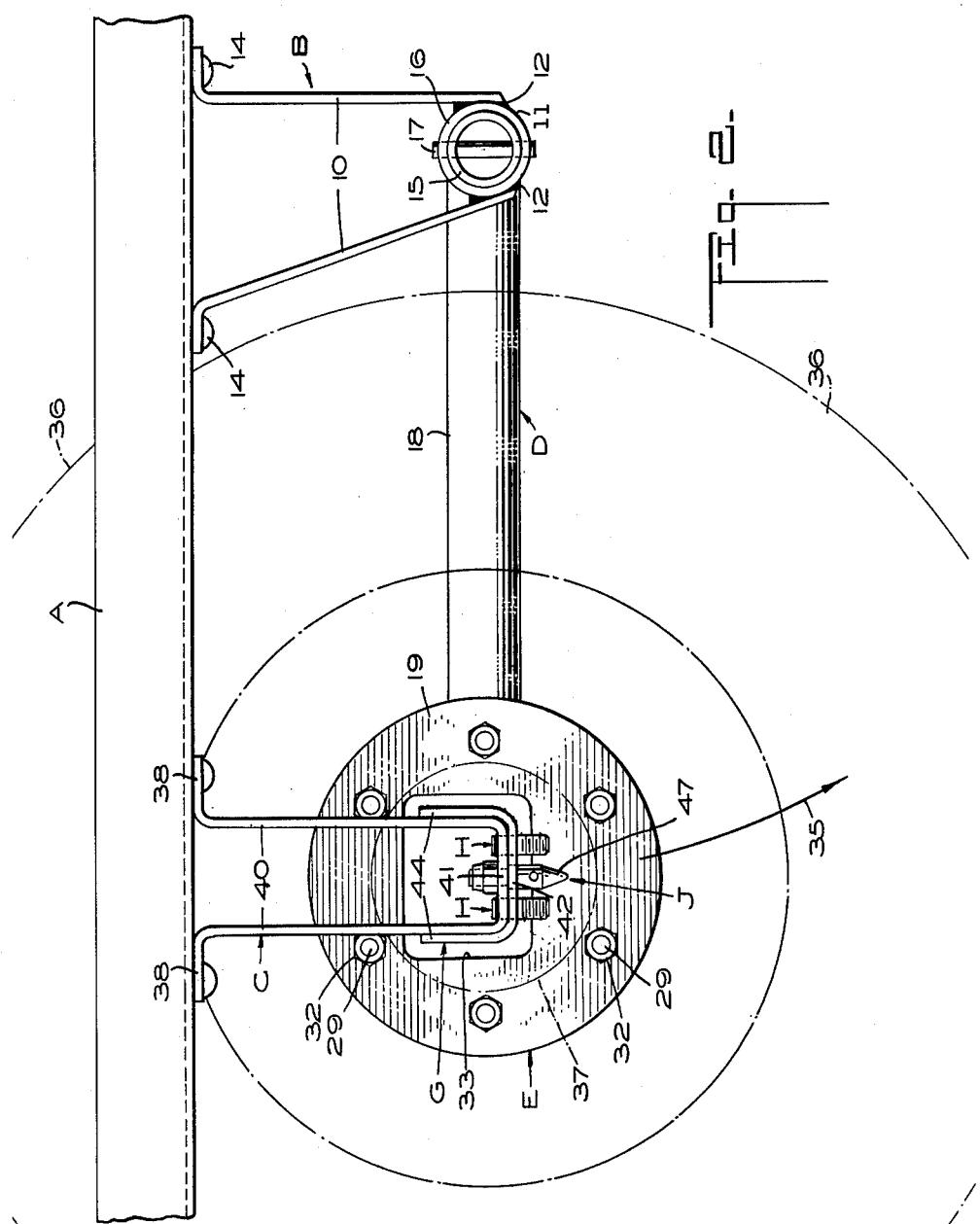

April 6, 1954 K. C. CLARK 2,674,393
SPARE WHEEL CARRIER
Filed Dec. 4, 1951 3 Sheets-Sheet 3
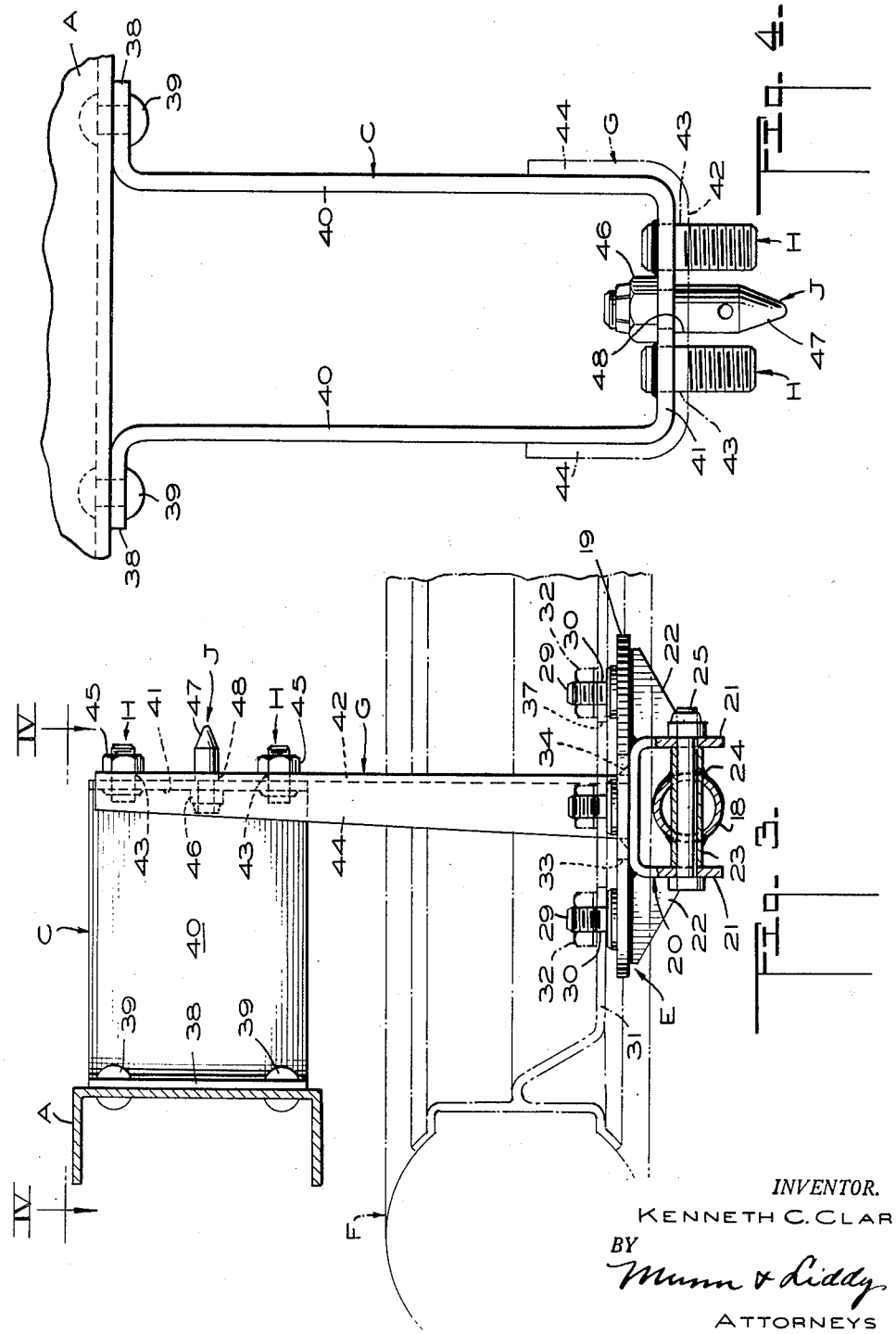
INVENTOR.
KENNETH C. CLARK
BY
Munn & Liddy
ATTORNEYS

Patented Apr. 6, 1954

2,674,393

UNITED STATES PATENT OFFICE 2,674,393

SPARE WHEEL CARRIER

Kenneth C. Clark, Watsonville, Calif.

Application December 4, 1951, Serial No. 259,809

1 Claim. (Cl. 224—42.22)

The present invention relates to a spare wheel carrier and embodies improvements over the "Tire-Wheel or Tire-Rim Assembly Carrier" described in my United States Letters Patent No. 2,489,561, granted November 29, 1949.

In the above identified patent, I provide a substantially L-shaped supporting arm having one end thereof journalled in a swivel bracket, and its free end arranged for swinging in a horizontal plane. Moreover, this arm has a platform arranged at its free end for carrying a tire-wheel or a tire-rim assembly, the platform being swingable from a position overlying the supporting arm into an inclined position where the tire will rest on a roadway. In order to swing the platform, a lever is provided; and the lever is adapted to be attached to an anchorage bracket by studs projecting from this bracket when the carrier is arranged in travelling position, whereby the lever serves as a hanger for the platform.

However, during severe road tests by manufacturers and governmental agencies, especially in connection with equipping trucks of the Armed Services with my carrier, it has been determined that the supporting arm will become distorted when striking obstructions. Also, this arm will sag under the weight of larger spare wheels mounted on the carrier. At times, these conditions will preclude the lever from being attached to the anchorage bracket by means of the studs fixed to and projecting from the latter.

Accordingly, the cardinal object of this invention is to provide improved structure, wherein the lever is guided into a predetermined final position of registration with the anchorage bracket, as the lever is moved toward this bracket, regardless of limited distortions of the supporting arm. Thus, the lever may be attached to this bracket by means of the studs.

More specifically stated, I provide a centering pin on the anchorage bracket having a tapered end disposed for insertion through a pin-receiving opening in the lever. The pin is adapted to bear against the wall of this opening to guide the lever into a position of perfect alignment with the anchorage bracket as the lever approaches this bracket. This will assure passage of the studs through the stud-receiving openings in the lever.

Other objects and advantages will appear as the specification continues. The novel features will be set forth in the claim hereunto appended.

Drawings

For a better understanding of the invention, reference should be had to the accompanying drawings, in which:

Figure 1 is a side elevational view illustrating my improved spare wheel carrier secured to the chassis frame of a vehicle;

Figure 2 is a top plan view thereof, as observed from the plane II—II in Figure 1;

Figure 3 is a vertical transverse sectional view taken along the line III—III of Figure 1; and Figure 4 is a top plan view of the improved anchorage bracket, as seen from the plane IV—IV of Figure 3.

While I have shown only the preferred form of my invention, it should be understood that various changes, or modifications, may be made within the scope of the annexed claim without departing from the spirit thereof.

Detailed description

Referring to the drawings in detail, I have shown the chassis frame A of a vehicle, forming part of a truck, trailer, semi-trailer, or the like. This frame has swivel and anchorage brackets B and C, respectively, fixed thereto so as to project horizontally therefrom. Broadly speaking, a supporting arm D is journalled in the swivel bracket B for swinging movement. This arm swingably carries a platform E on which a spare wheel F is removably mounted.

For swinging this platform, a lever G is interconnected therewith. When the lever and anchorage bracket are brought into final registration with one another, as disclosed in Figures 1, 2 and 3, they are coupled together by studs H, whereby the lever will constitute a hanger for the platform E and the arm D. As the lever G is moved toward the anchorage bracket C, they are guided into final registration with one another by a centering pin J, regardless of limited distortion of the supporting arm.

In its structural features, the swivel bracket B includes a pair of angular-shaped plates 10 having a vertically-disposed tubular bearing 11 welded, or otherwise attached thereto, as at 12. These plates are attached by rivets 14, or the like, to the chassis frame. It will be noted that the supporting arm D is substantially L-shaped, and has the vertical leg 15 thereof telescoped upwardly through the bore of the bearing 11 so as to project thereabove (see Figure 1). A collar 16 is fixed by a pin 17 to the upper part of the leg 15 so as to bear against the top of the tubular bearing, and thus limit downward movement of this leg of the supporting arm. However, the leg 15 has freedom of turning movement with respect to the bearing, allowing the other leg 18 of the arm D to swing in a substantially horizontal plane below the chassis frame.

In Figures 1 to 3, inclusive, I show the swingable platform E as including a plate or disc 19 having a channel-shaped base 20 welded or otherwise attached to its underneath surface. The flanges 21—21 of this base project downwardly in straddling relation with the forward section of the horizontal leg 18 of the supporting arm D. Gussets 22 provide reinforcements between the disc 19 and the flanges 21—21. A bearing sleeve 23 extends transversely through the forward part of the leg 18, and is welded thereto, as at 24 (see Figure 3). The opposing ends of this sleeve abut the flanges 21—21. A horizontal pivot bolt 25 extends through the flanges 21—21 and the bearing sleeve 23, thus permitting the platform E to be tilted relative to the supporting arm D. It will be observed from Figure 1 that the bolt 25 is disposed off-center relative to the disc 19.

This construction allows the disc 19 to be moved into a horizontal position overlying the leg 18, as disclosed in Figures 1 to 3, inclusive, or to be swung about the axis of the bolt 25 into an upright position, as suggested by the arrow 26 in Figure 1. When occupying the latter position, a stop bar 27 fixed to the flanges 21—21 strikes against an inclined end 28 of the supporting leg 18.

In order to removably mount the spare wheel F on the tiltable platform E, the disc 19 of the latter has a plurality of studs 29 secured thereto so as to project therefrom. I do not wish to be limited with reference to the particular number of these studs employed. When the wheel is applied to the platform, the studs 29 are inserted through openings 30 provided in the hub 31 of the wheel. Thereafter, nuts 32 are threaded onto these studs so as to anchor the wheel to the tiltable platform.

As previously pointed out, the lever G is employed for swinging the tiltable platform E between vertical and horizontal positions. In order to interconnect the lever with the platform for this purpose, the lower end of the lever projects downwardly through an opening 33 fashioned in the disc 19, and is welded at 34 to the base channel 20 (see Figures 1 and 3).

Assuming that an operator desires to mount the spare wheel F on the tiltable platform, the supporting arm D is swung laterally in the bearing 11, as suggested by the arrow 35 in Figure 2, until the platform E is disposed clear of the body of the vehicle. Now the platform is swung about the bolt 25 in the direction of the arrow 26 into a vertical position by means of the lever G, thus bringing the latter into a substantially horizontal position.

With the platform thus disposed, the spare wheel is rolled into a position alongside of the carrier, with its tire 36 resting on the underlying roadway (not shown). Next, the lever is inserted through the opening 37 in the hub 31 (see Figures 2 and 3), and the wheel is moved toward the disc 19, with the studs 29 passing through the hub openings 30. Threading of the nuts 32 onto these studs will result in securing the wheel to the platform.

As the next step, the operator grasps the lever G and swings the latter into a vertical position, thus bringing the disc 19 and the spare wheel F into horizontal positions overlying the leg 18 of the supporting arm D. Inasmuch as the bolt 25 is arranged towards the left and off-center with respect to the disc 19 in Figure 1, the tendency of the wheel will be to remain in a position overlying the supporting arm.

Subsequently, the arm D and the spare wheel F are swung inwardly into an out-of-the-way position, with the tire 36 projecting underneath the chassis frame A, as shown in Figures 2 and 3. During this movement, the lever G is moved toward the anchorage bracket C, and thereafter is secured thereto by the studs H.

It will be noted from the drawings that the anchorage bracket C is substantially channel-shaped, and is provided with outwardly-turned feet 38. The latter are secured by rivets 39, or other means, to the chassis frame A. This bracket has its flanges 40 projecting laterally from the frame A, and its web 41 has the studs H welded or otherwise fixed thereto so as to extend therefrom.

The lever G is channel-shaped, and its web 42 is fashioned with stud-receiving openings 43 therein. As this lever is moved toward the anchorage bracket, its flanges 44 telescope over the flanges 40 of this bracket, and the studs H project through the openings 43. Thereafter, nuts 45 are applied to these studs so as to draw the webs 41 and 42 together.

However, actual practice reveals the fact that the supporting arm D often will sag under the weight of the spare wheel F, especially when the latter is of the heavier type. Moreover, this arm is apt to become distorted, due to striking obstructions, etc. Under these conditions, the studs H will not be aligned with the openings 43 in the lever G as the latter is moved toward the anchorage bracket C. Therefore, I have provided the centering pin J for bringing the lever into a position of final alignment with the anchorage bracket as the lever approaches this bracket.

As shown in Figures 3 and 4, the centering pin is fixed by a nut 46 to the bracket web 41 so as to extend forwardly from this web in parallel relation with the studs H. This pin has a tapered or conical-shaped forward end 47 disposed for insertion through a pin-receiving opening 48, which is fashioned in the web 42 of the lever. The centering pin has a smooth cylindrical surface. This tapered end is arranged to bear against the wall of the opening 48 so as to guide the lever G into a position wherein the stud-receiving openings 43 will be aligned with the studs H as the lever approaches the anchorage bracket. Distortion of the supporting arm D, within limits of the centering pin, will be overcome, assuring alignment of the openings 43 with the studs H. The clearance of the holes for the studs 43 is such that the threads of the studs H are not contacted by the walls of the holes as the lever moves into final position against the bracket arm.

Within the spirit of this invention, the centering pin J could be carried by the lever G and projected through an opening in the anchorage bracket C as the former approaches the latter. The same result would be obtained. In a like manner, the studs H could be fixed to the lever and caused to project through openings in this bracket. However, it is desirable to mount both the studs H and the centering pin J on the anchorage bracket, since the operator will be afforded a clearer field of view when securing the lever to the bracket C.

When the operator desires to demount the spare wheel F from the carrier, the nuts 45 are removed from the studs H. Now the supporting arm D, the platform E and the wheel are swung outwardly, as indicated by the arrow 35 in Figure 2. The lever G can be grasped and pulled upon by the operator to accomplish this movement.

Next, the operator swings the lever G counter-clockwise in Figure 1 so that the platform will move about the bolt 25 into a vertical position, as suggested by the arrow 26 in this view. At this time, the tire 36 will come to rest on the underlying roadway. Removal of the nuts 32 will allow the spare wheel to be rolled away from the carrier. Very little effort is required to mount a spare wheel on my carrier, or to remove the wheel therefrom.

In adapting my carrier to certain types of vehicles, it has been necessary to tip the plate 19 and the base 20 transversely in order that the spare wheel will clear obstructions of the vehicle when the carrier is mounted in travelling position. This modification is obvious and no illustration thereof is considered necessary.

I claim:

In a spare wheel carrier, a swivel bracket adapted to be secured to a chassis frame, a supporting arm journaled in said bracket for swinging movement, a platform carried by the arm, means for mounting a wheel on the platform, a lever connected to the platform for moving the platform and arm, an anchorage bracket adapted to be secured to the chassis frame, the lever, platform and arm being movable toward and away from the anchorage bracket, a pair of threaded studs fixed to said anchorage bracket in spaced relationship and extending outwardly therefrom, said lever having spaced openings for receiving said studs and alignable therewith upon pivotal movement of said lever arm and platform to move said lever into facing position with respect to said anchorage bracket, said lever, platform and arm being distortable to move said spaced openings out of aligned relationship with said studs when said lever is in facing position with respect to said studs, and means for aligning said spaced openings with said studs in said facing position despite such distortion comprising a centering pin having a smooth cylindrical surface fixed to said anchorage bracket and having a conically shaped end projecting outwardly of said threaded studs and terminating at the apex thereof, said lever having means forming an opening for receiving said pin, said last named means comprising a wall engageable with said conically shaped end upon pivotal movement of said lever arm and platform into facing relationship with respect to said anchorage bracket and slidable along said smooth cylindrical surface.

References Cited in the file of this patent

UNITED STATES PATENTS

| Number | Name | Date |
|---|---|---|
| Re. 22,928 | Sargent et al. | Oct. 14, 1947 |
| 2,479,155 | Clark | Aug. 16, 1949 |
| 2,489,561 | Clark | Nov. 29, 1949 |